United States Patent [19]

Chuang

[11] Patent Number: 5,777,571
[45] Date of Patent: Jul. 7, 1998

[54] REMOTE CONTROL DEVICE FOR VOICE RECOGNITION AND USER IDENTIFICATION RESTRICTIONS

[75] Inventor: Chen-Tien Chuang, Yun-Kong, Taiwan

[73] Assignee: Holtek Microelectronics, Inc., Hsinchu, Taiwan

[21] Appl. No.: 720,661

[22] Filed: Oct. 2, 1996

[51] Int. Cl.[6] .................................................. G10L 5/06
[52] U.S. Cl. ........................ 341/176; 341/173; 381/110; 381/105
[58] Field of Search ................................. 341/173, 176; 379/74; 381/110, 105; 340/825.72; 295/2.84

[56] References Cited

U.S. PATENT DOCUMENTS

| | | | |
|---|---|---|---|
| 5,146,215 | 9/1992 | Drori | 340/825.32 |
| 5,199,080 | 3/1993 | Kimura | 381/110 |
| 5,247,580 | 9/1993 | Kimura | 381/43 |
| 5,267,323 | 11/1993 | Kimura | 381/110 |
| 5,479,490 | 12/1995 | Nakashima | 379/74 |

Primary Examiner—Michael Horabik
Assistant Examiner—Albert K. Wong
Attorney, Agent, or Firm—Tung & Associates

[57] ABSTRACT

A remove control device that has voice recognition and user ID restriction functions equipped with a receiver is provided. The device includes a radio frequency (RF) receiving circuit, a demodulator, a voice input control device, an analog to digital conversion signal control unit, a buffer, a memory, a voice recognition processing unit, an instruction verification device, and an output control device. When the receiver is in a voice training mode, the signal characteristics of the voice command from the user can be stored in a memory. When the receiver is in an instruction execution mode, the receiver receives signals transmitted from the emitter, recognizes and compares the signal with the original signal stored in the memory during the voice training mode and determine if it is from an authorized user. Only after the identification matches the instruction verification device that verifies the received instruction, the output control device outputs a corresponding control signal.

8 Claims, 4 Drawing Sheets

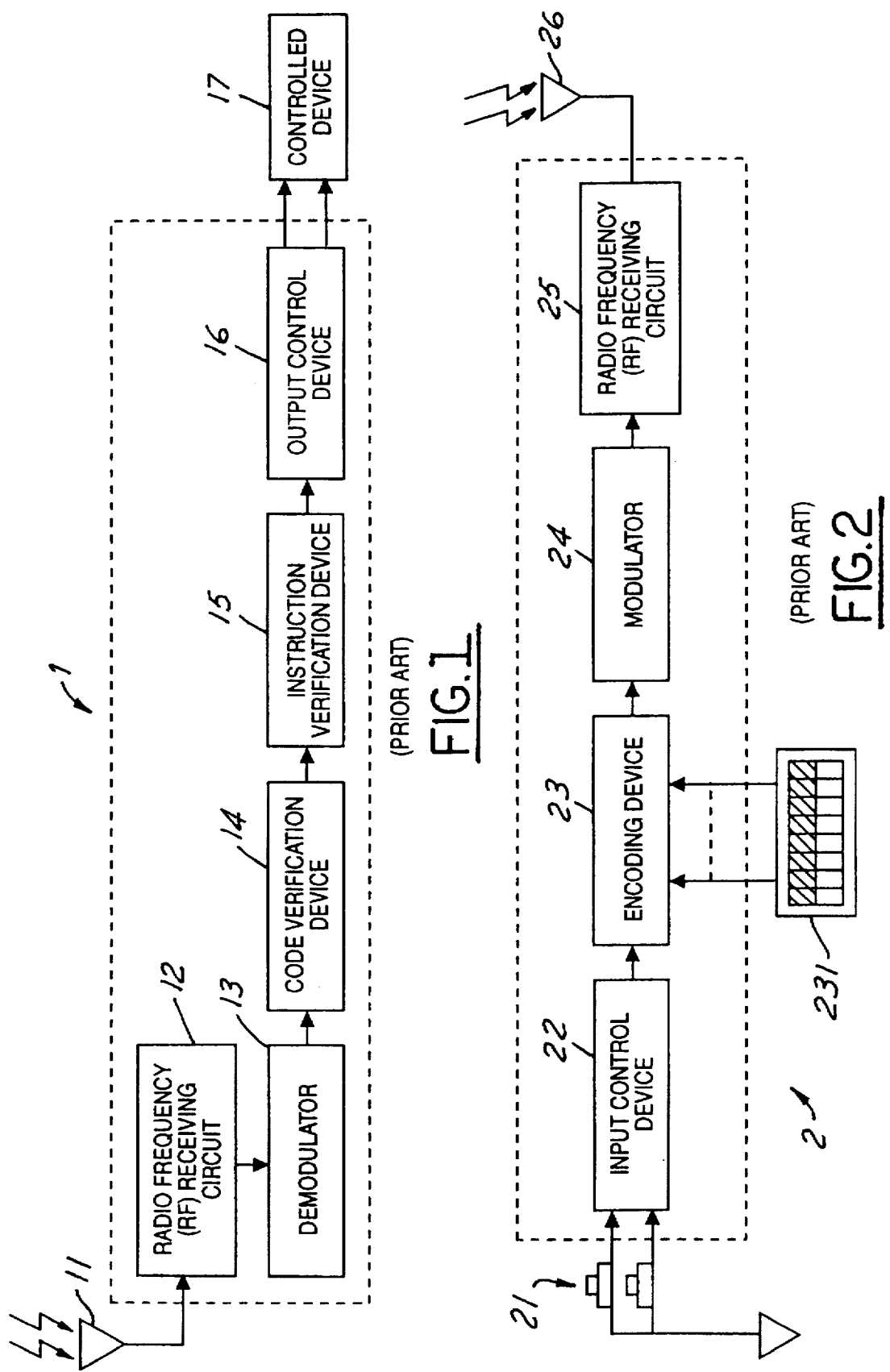

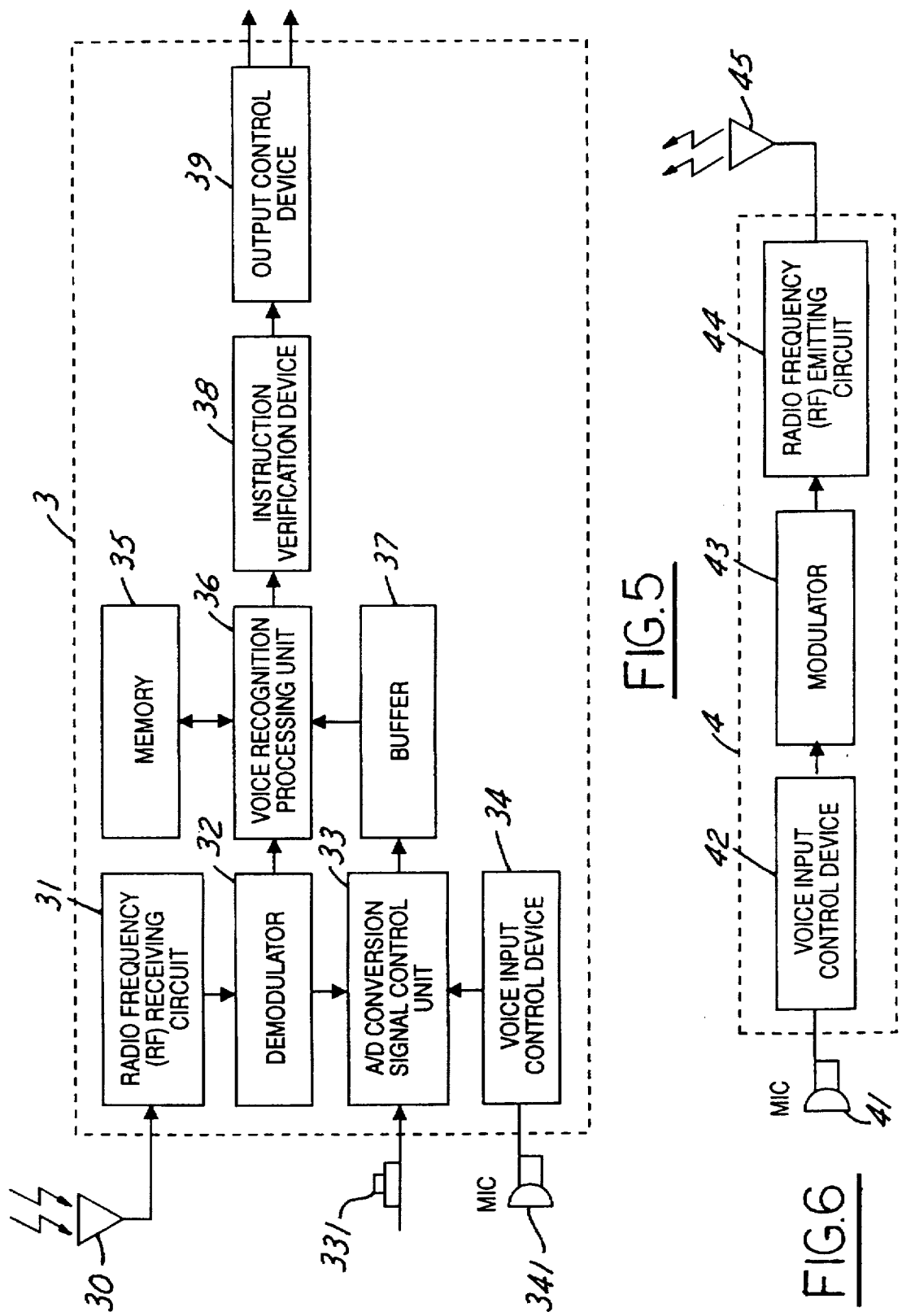

REMOTE CONTROL DEVICE FOR VOICE RECOGNITION AND USER IDENTIFICATION RESTRICTIONS

FIELD OF THE INVENTION

The present invention generally relates to a remote control device and more particularly, relates to a remote control device that has voice recognition and user ID restriction functions.

BACKGROUND OF THE INVENTION

A remote control device normally consists of an emitter and a receiver. FIG. 1 shows a block diagram for a typical remote control circuit. Receiver 1 includes a receiving antenna 11, a radio frequency receiving circuit 12, a demodulator 13, a code verification device 14, an instruction verification device 15, and an output control device 16. The output control device 16 outputs control signals and controls an outside device 17.

FIG. 2 shows a block diagram for an emitter circuit used in a typical remote control device. Emitter 2 includes a push button 21, an input control device 22, an encoding device 23, a modulator 24, a radio frequency emitter circuit 25, and an emitting antenna 26. The signal emitted from emitter 2 is sent through the emitting antenna 26 and received by the receiver shown in FIG. 1. The encoding device 23 has an encoding switch 231 (for example, a conventional finger-operated switch) to setup different codes.

In the operation of the conventional remote control device, a user presses the button 21 on the emitter 2 (shown in FIG. 2), a signal is transmitted through the input control device 22 and the encoding device 23 to the modulator 34 for modulation. Subsequently, the radio frequency emitting circuit 25 and the emitting antenna 26 emit a specific code corresponding to the pressed button.

FIG. 3 is a flow diagram showing the internal control of a receiver which includes the following steps:

Step 101: Start

Step 102: Wait

Step 103: Determine if a signal is received. If not received, then go back to step 102 to continue waiting. If a signal is received, then perform step 104.

Step 104: Determine if the code is correct. If not correct, then go back to step 102 and continue waiting. If code is correct, then perform step 105.

Step 105: Execute instruction. After the instruction is executed, go back to step 102 to continue waiting.

FIG. 4 is a flow diagram showing the internal control of an emitter which includes the following steps:

Step 201: Start.

Step 202: Wait.

Step 203: Determine if any button is pressed. If not pressed, then go back to step 202 to continue waiting. If button is pressed, then perform step 204.

Step 204: Read and encode.

Step 205: Transmit signal. Emit the instructions from the pressed button.

The receiver 1 shown in FIG. 1 receives the emitted signals through the receiving antenna 11 and the radio frequency receiving circuit 12, and then demodulate the signals by the demodulator 13. The code verification device 14 and the instruction verification device 15 then check the specific code and proceed decoding. Finally, the output control device 16 outputs a control signal so that a corresponding control action can be carried out.

One disadvantage of the conventional technique is that it can not identify and limit the users who operate the remote control. As a result, once the emitter for the remote control device is lost, it poses a security risk to the user of the device.

SUMMARY OF THE INVENTION

The present invention provides a remote control device that has voice recognition and user ID restriction functions equipped with a receiver that includes a radio frequency (RF) receiving circuit, a demodulator, a voice input control device, an analog to digital conversion signal control unit, a buffer, a memory, a voice recognition processing unit, an instruction verification device, and an output control device. When the receiver is in a voice training mode, the signal characteristics of the voice command from the user can be stored in a memory. When the receiver is in an instruction execution mode, the receiver receives signals transmitted from the emitter, recognizes and compares the signal with the original signal stored in the memory during the voice training mode and determines if it is from an authorized user. Only after the identification matches the instruction verification device that verifies the received instruction, the output control device outputs a corresponding control signal.

BRIEF DESCRIPTION OF THE DRAWINGS

Other objects, features and advantages of the present invention will become apparent upon consideration of the specification and the appended drawings in which:

FIG. 1 is a block diagram for a circuit of a receiver in a conventional remote control device.

FIG. 2 is a block diagram for a circuit of an emitter in a conventional remote control device.

FIG. 5 is a block diagram for a circuit of a receiver in the present invention device.

FIG. 6 is a block diagram for a circuit of an emitter in the present invention device.

DETAILED DESCRIPTION OF THE PREFERRED EMBODIMENT

Figure 3:
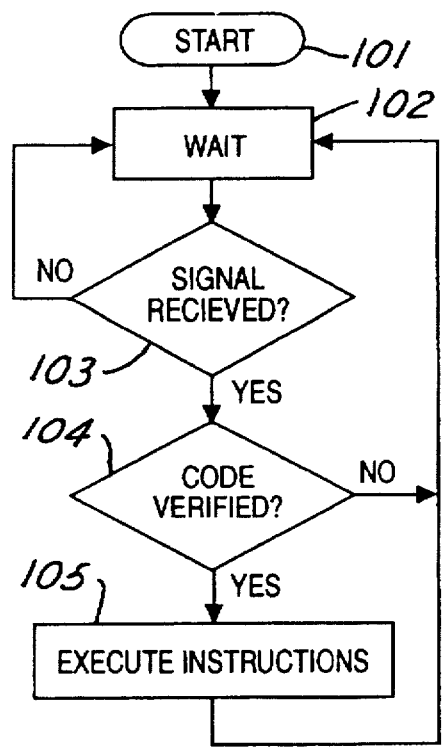
FIG. 3 is a flow chart for the internal control of a conventional receiver.
Figure 4:
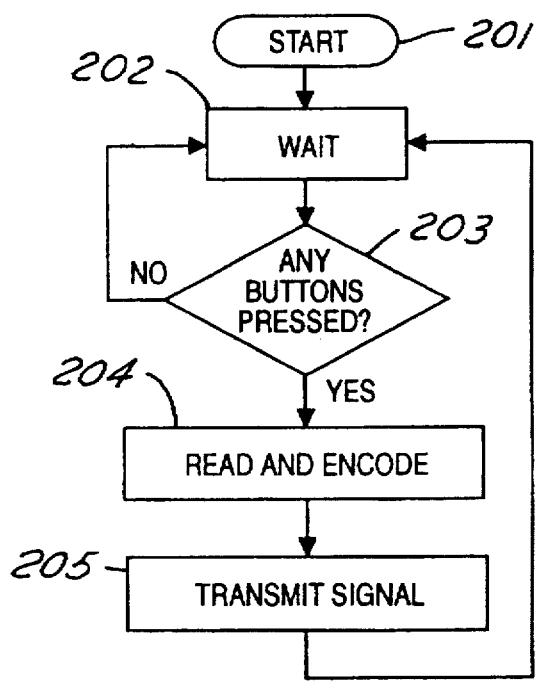
FIG. 4 is a flow diagram for a circuit of a conventional emitter.

One of the objectives of the present invention is to provide a remote control device that is capable of recognizing a voice and then restricting its use only to the authorized user. When a receiver receives a signal transmitted from a emitter, it proceeds to recognize and compare the voice and to determine if the voice is from one of the authorized users. If the identification is positive, then the instruction verification device verifies the received instruction to enable an output control device to output a control signal corresponding to the instruction. Based on the voice recognition capability of the present invention device, user IDs can be screened such that only certain users can activate the remote control device.

Another objective of the present invention is to provide an easily operable remote control device. The present invention device does not require an emitter such as those used in a conventional remote control device in order to perform the function of remote control. The emitting end utilized is a small wireless microphone. When operating the remote control device, the user speaks into the microphone with certain instructions, a receiver receives the voice code and performs a voice recognition function and determines if the user is an authorized user and the instruction is a legitimate instruction.

Still another objective of the present invention is to provide a remote control device that is capable of learning instructions. In the voice training mode of the receiver, the user's voice command signal is transmitted to a voice input control device via a microphone. It is then converted to a digital voice signal by an A/D signal conversion control unit and temporarily stored in a buffer and then a voice recognition processing unit stores the characteristics of the voice in the memory. The voice training function of the present invention, that is capable of being programed by voices of certain users, enables the receiver of the remote control device to recognize certain authorized users. Before using the remote control device, the authorized users must input a voice pattern into the receiver to recognize instructions which can be defined in any desirable way. For example, depending on a specific user's preference, the same execution of the instruction "open" can be taught to the receiver as "Kai", "DaKai", "Open", "On" etc. instructions. Based on the training capability, the present invention device can limit its usage to certain authorized users. In other words, through the voice training capability, the receiver of the remote control device only recognizes instructions given by those authorized users. Any other user who has not performed the voice training to the device is considered an illegal user.

Description of numerals used in the figures 1 conventional receiver
11 receiving antenna
12 radio frequency (RF) receiving circuit
13 demodulator
14 code verification device
15 instruction verification device
16 output control device
17 controlled device
2 conventional emitter
21 push buttons
22 input control device
23 encoding device
231 encoding switch
24 modulator
25 radio frequency (RF) emitting circuit
26 emitting antenna
3 receiver
30 receiving antenna
31 radio frequency (RF) receiving circuit
32 demodulator
33 analog/digital (A/D) conversion signal control unit
331 voice training control switch
34 voice input control device
341 microphone
35 memory
36 voice recognition processing unit
37 buffer
38 instruction verification device
39 output control device 4 emitter
41 microphone
42 voice input control device
43 modulator
44 radio frequency (RF) emitting circuit
45 emitting antenna Referring now to FIG. 5 which is a block diagram for the circuit of the remote control receiver of the present invention device. The receiver 3 includes a receiving antenna 30, a radio frequency (RF) receiving circuit 31, a demodulator 32, an analog/digital (A/D) conversion signal control unit 33, a voice input control device 34, a memory device 35, a voice recognition processing unit 36, a buffer 37, an instruction verification device 38, and an output control device 39. The output control device 39 is used to output control signals to control an outside device. In addition, the receiver of the present invention includes a voice training control switch 331 and a microphone 341.

The receiver of the present invention device operates in two working modes. One is the voice training mode and the other is the instruction execution mode. In the voice training mode, the voice training is performed through the voice training control switch 331 and the microphone 341. When a user presses down the voice training control switch 331, the voice training operation is in process. The voice signal of the user is transmitted to the input control device 34 via microphone 341, then converted to a digital voice signal through an A/D conversion signal control unit 33 and temporarily stored in the buffer 37. The digital voice signal is later processed by the voice recognition processing unit 36 to store voice characteristics in the memory 35. The method of obtaining the voice characteristics can be a conventional technique.

In the instruction execution mode, when a signal is received by the RF receiving circuit 31 through the receiving antenna 30, the signal is demodulated by demodulator 32 and then converted into digital signal by the A/D conversion signal control unit 33 and temporarily stored in a buffer 37. In the meantime, the voice recognition processing unit 36 processes and compares the received signal against previously stored signals in the memory 35 and determines if the user is one of the pre-authorized users. If the identification is positive, then it is further verified with the instruction verification device 38 to see which function is to be executed. Finally, an instruction control signal is outputted by the output control device 39.

FIG. 6 shows a block diagram for the circuit of the remote control emitter of the present invention device. The emitter 4 includes a microphone 41, a voice input control device 42, a modulator 43, a radio frequency (RF) emitting circuit 44, and a emitting antenna 45. When a user activates the microphone 41, a voice instruction signal is transmitted to the voice input control device 42 through microphone 41, and is then modulated by the modulator 43. Finally, the voice instruction signal is emitted by the RF emitting circuit via the emitting antenna.

Figure 7:
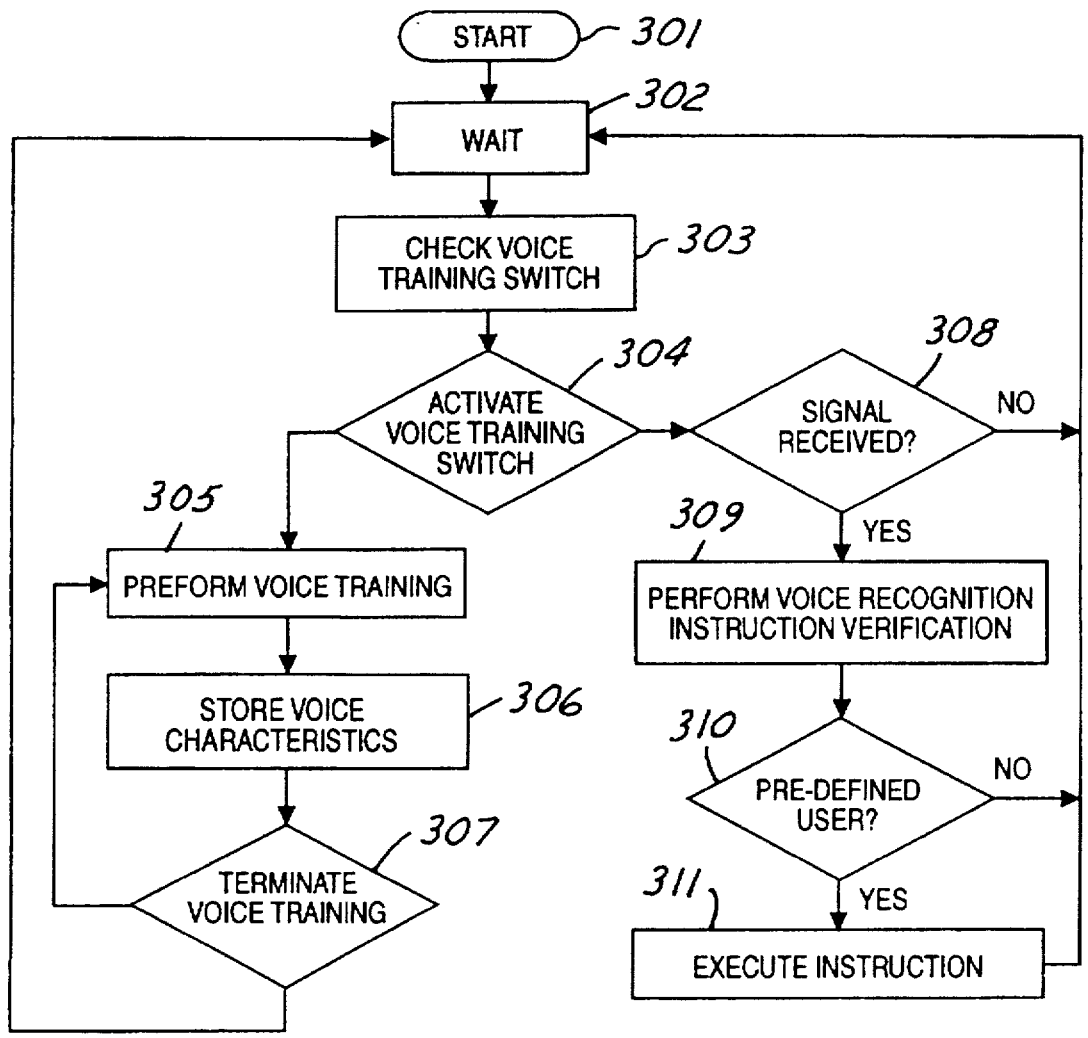
FIG. 7 is a flow chart for the internal control of the receiver in the present invention device.
Figure 8:
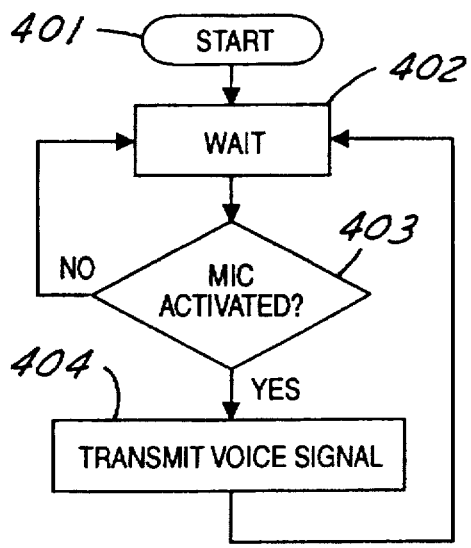
FIG. 8 is a flow chart for the internal control of the emitter in the present invention device.

The flow chart for the internal control of the receiver used in the present invention device shown in FIG. 7 illustrates the following operating steps:

Step 301: Start.
Step 302: Wait.
Step 303: Check the voice training control switch status.
Step 304: Determine if the voice training control switch is on. If yes, then perform step 305. If no, perform step 308.
Step 305: Perform voice training.

Step 306: Store voice characteristics.

Step 307: Determine if voice training should be terminated. If not, go back to step 305, continue to perform voice training and store voice characteristics steps. If yes, stop voice training procedure and return to step 302 and wait.

Step 308: In step 304, determine if the voice training switch is on. If not on, then perform step 308 to further determine if a signal is received.

Step 309: Perform voice recognition and comparison.

Step 310: Determine if the user is one of the pre-authorized users. If yes, then execute instruction (i.e., step 311). If no, stop the procedure and return to step 302 and wait.

The flow chart for the internal control of the emitter of the present invention device (shown in FIG. 7) illustrates the following operating steps:

Step 401: Start.

Step 402: Wait.

Step 403: Determine if microphone is activated. If no, return to step 402 and continue waiting. If microphone activation is detected, then execute the next step 404.

Step 404: Transmit voice signal. After transmission is complete, return to step 402 and wait.

From the descriptions above, the present invention device is capable of performing following functions: (1). Voice recognition function: the device can screen user identification. Only authorized users can activate the remote control, (2). Voice training function: the device can be taught with voices of certain users, so that the receiver of the remote control can recognize those users, and (3). Restrict one or more authorized users function: Based on the voice training function, the receiver of the remote control recognizes only those commands from specific users, and treats users whose voices are not taught as illegal users.

The advantages made possible by the present invention device are that the device does not require a traditional remote emitter, that the remote control operation can be controlled by voices, that the device has the capability of restricting multiple authorized users, and that the device has improved security and safety.

While the present invention has been described in an illustrative manner, it should be understood that the terminology used is intended to be in a nature of words of description rather than a limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A remote control device having voice recognition and user ID restriction functions, said remote control device comprising:

an emitter and a receiver, said emitter comprising a first voice input control device to receive a user voice instruction signal, said first voice input control device being connected to a modulator, an output of said modulator controlling a RF emitting circuit, said receiver having a voice training mode and an instruction execution mode and comprising:

a second voice input control device for inputting user voice signals to said receiver in said voice training mode, a RF receiving circuit to receive said user voice instruction signal to said receiver in said instruction execution mode, a demodulator connected to an output of said RF receiving circuit, an analog/digital conversion signal control unit controlled from said demodulator and from said second voice input control device, voice recognition processing unit connected to an output of said analog/digital conversion signal control unit through a buffer, a memory unit connected to said voice recognition processing unit via a two-way connection, an instruction verification device controlled by said voice recognition processing unit, and an output control device connected to an output of said instruction verification device.

2. A remote control device according to claim 1, wherein said receiver further comprising a voice training control switch for initiating the operation of the voice training mode.

3. A remote control device according to claim 1, wherein when said receiver is in said voice training mode, the user voice signal is first transmitted to said second input control device through a first microphone and then converted to digital voice signal through said analog/digital conversion signal control unit and stored temporarily in said buffer, said digital voice signal is later processed by said voice recognition processing unit to store voice characteristics in said memory unit.

4. A remote control device according to claim 1, wherein when said receiver is in said instruction execution mode, said user voice instruction signal is first received by said RF receiving circuit and demodulated by said demodulator and then converted into digital signal by said analog/digital conversion signal control unit and temporarily stored in said buffer, said voice recognition processing unit is capable of obtaining the characteristics of the voice signal, comparing against a previously stored signal in said memory unit and determining if the user is one of the authorized users, when said determination is positive, then it is further verified with the instruction verification device and said instruction control signal is outputted via an output control device.

5. A remote control device according to claim 4, wherein said RF receiving circuit further comprises a receiving antenna for receiving a RF instruction signal from said emitter.

6. A remote control device according to claim 4, wherein said instruction verification device verifies functions corresponding to the user instruction.

7. A remote control device according to claim 4, wherein said output control device outputs a control signal to an outside device.

8. A remote control device according to claim 1, wherein said emitter further comprising a second microphone and an emitting antenna such that when a user's voice instruction signal received by said second microphone is transmitted to said first voice input control device and modulated by said modulator, said voice instruction signal is emitted by the RF emitting circuit via the emitting antenna to the receiver for performing instruction execution.

* * * * *